United States Patent [19]

Schneider

[11] Patent Number: 5,455,587
[45] Date of Patent: Oct. 3, 1995

[54] THREE DIMENSIONAL IMAGING MILLIMETER WAVE TRACKING AND GUIDANCE SYSTEM

[75] Inventor: Arthur J. Schneider, Pasadena, Calif.

[73] Assignee: Hughes Aircraft Company, Los Angeles, Calif.

[21] Appl. No.: 97,298

[22] Filed: Jul. 26, 1993

[51] Int. Cl.$^6$ ................................................ G01S 13/00
[52] U.S. Cl. .......................................... 342/62; 244/3.14
[58] Field of Search ............................. 342/62; 244/3.11, 244/3.12, 3.14, 3.17, 3.19

[56] References Cited

U.S. PATENT DOCUMENTS

| | | | |
|---|---|---|---|
| 3,856,237 | 12/1974 | Torian et al. | 244/3.11 |
| 4,204,210 | 5/1980 | Hose | 342/62 |
| 4,665,401 | 5/1987 | Garrard et al. | 342/62 X |
| 5,225,838 | 7/1993 | Kanter et al. | 342/62 |

*Primary Examiner*—Mark Hellner
*Attorney, Agent, or Firm*—R. M. Heald; C. D. Brown; W. K. Denson-Low

[57] ABSTRACT

An improved imaging system. The inventive imaging system (10) is adapted to transmit a plurality of first radar signals at millimeter wave frequencies at an area including an object along with background clutter. The return signals are processed to provide a three dimensional image for applications demanding visibility through fog, haze, smoke and other obscurants. Such applications include enhanced vision for helicopters, ships, buses, trucks, traffic observation stations for an intelligent highway or security cameras for plants and military installations. In a guidance system application, for example, the inventive system would include an electronically scanning antenna (12) to provide range and amplitude signals representative of a target area. The range and amplitude signals (18, 20) are compared to stored signals (26, 30) to create the three dimensional image. The stored signals are selected for comparison based on the dive angle of the missile (28, 32). The three dimensional image is then processed (22, 24, 34, 36, 38, 40) to derive guidance commands for the missile.

7 Claims, 4 Drawing Sheets

THREE DIMENSIONAL IMAGING MILLIMETER WAVE TRACKING AND GUIDANCE SYSTEM

BACKGROUND OF THE INVENTION

1. Field of the Invention

The present invention relates to tracking and guidance systems. More specifically, the present invention relates to air-to-ground tracking and guidance systems.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

2. Description of the Related Art

Many systems and techniques are known in the art for providing terminal guidance for missiles and other aircraft, including television, infrared, radar, and laser based systems. Each has advantageous in certain applications. For example, television based systems allow a human operator to be involved in the target selection, discrimination and guidance processes. However, television guided systems are limited to environments with adequate visibility. Thus, these systems are not as useful at night, in fog, rain or smoke.

Infrared systems provide guidance based on heat radiated from a target. Infrared systems are not limited to environments with good visibility. However, infrared systems generally have limited range and limited accuracy when the target and its background have comparable thermal profiles.

Laser guided systems offer good accuracy but are limited in range and expensive.

Radar guided systems provide an all-weather capability. However, the accuracy of conventional radar guided systems is limited when attacking at high dive angles and when attacking vertical targets.

Thus, a need exists in the art for a system for accurately guiding a craft to a target at high dive angles in adverse weather conditions. Further, there is a need in the art for a system for accurately guiding a craft to a vertically structured target from the side at a low or nearly horizontal trajectory.

SUMMARY OF THE INVENTION

The need in the art is addressed by the present invention which provides an improved imaging system. The inventive imaging system is adapted to transmit a plurality of first radar signals at millimeter wave frequencies at an area including an object along with background clutter. The return signals are processed to provide a three dimensional image for applications demanding visibility through fog, haze, smoke and other obscurants. Such applications include enhanced vision for helicopters, ships, buses, trucks, traffic observation stations for an intelligent highway or security cameras for plants and military installations.

In a guidance system application, for example, the inventive system includes an electronically scanning antenna to provide range and amplitude signals representative of a target area. The range and amplitude signals are compared to stored signals to create the three dimensional image. The stored signals are selected for comparison based on the dive angle of the missile. The three dimensional image is then processed to derive guidance commands for the missile.

DESCRIPTION OF THE INVENTION

Illustrative embodiments and exemplary applications will now be described with reference to the accompanying drawings to disclose the advantageous teachings of the present invention.

Figure 1:
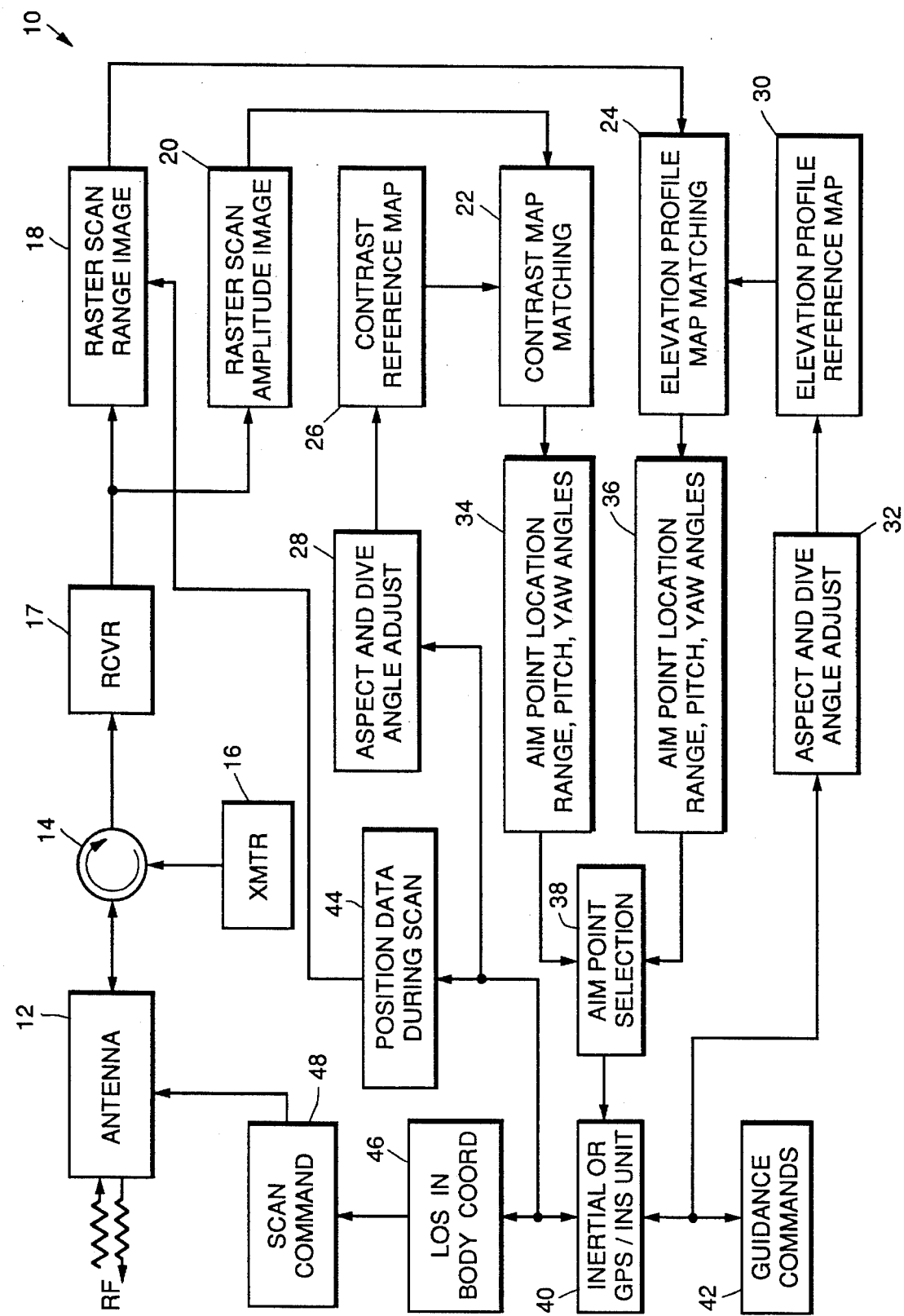
FIG. 1 is a functional block diagram of an illustrative implementation of the teachings of the present invention in a guidance system.

FIG. 1 is a block diagram of an illustrative implementation of the teachings of the present invention in a guidance system 10. The system includes an antenna 12 adapted to transmit and receive energy in a millimeter wave band, e.g. 94 gigahertz (Ghz). The antenna is adapted to scan a large area with a target or object in background clutter rapidly to provide a sufficient number of data points to perform correlation tracking in the manner described more fully below. To obtain an adequate data rate of several images per second, electronic scan of the radar beam is employed in at least one, preferably two, angular dimensions.

In the preferred embodiment, the antenna 12 is implemented with a Continuous Transverse Stub (CTS) antenna such as that disclosed in U. S. patent application Ser. No. 07/751,282, entitled CONTINUOUS TRANSVERSE STUB ELEMENT DEVICES AND METHODS OF MAKING SAME, filed Aug. 29, 1991, by William W. Milroy, (Atty. Docket No. PD 90546) the teachings of which are incorporated herein by reference. The CTS antenna is a sheet of plastic or ceramic with a number of parallel ridges running in one direction. The plastic sheet is plated on both sides to form a sheet type waveguide. The ends of protruding stubs are masked or machined so that the ends of the stubs are not plated. This antenna may be used in a single axis electronic scan mode by using a special feed on one edge of the antenna which is parallel to the direction of the stubs. A variable ridge along the edge may be adjusted to change the velocity of wave propagation along the waveguide and, in turn, causes the beam to be tilted or scanned in the direction of the stubs. Thus, scanning of the beam may be effected by moving a relatively small mechanical piece.

Scanning in the direction perpendicular to the ridges is accomplished by electronically varying the dielectric constant of the dielectric between the front and back sheets of the antenna. A special dielectric material is sensitive to the DC voltage applied from the front to back plates, thus controlling the propagation velocity of the millimeter wave energy and thereby the angle of the emitted beam.

The antenna 12 feeds a conventional circulator 14. The circulator 14 feeds energy from a conventional millimeter wave transmitter 16 to the antenna 12 in a transmit mode of operation and feeds millimeter wave returns therefrom to a conventional millimeter wave receiver 17. As is known in the art, millimeter wave radar signals may be used to generate range information. The output of the receiver 17 is provided to a first memory 18 for raster scan range image data and a second memory 20 for raster scan amplitude image data. Those skilled in the art will appreciate that the first and second memories may be implemented with a single memory. Each memory stores data for each individual pixel that is scanned. By storing range and amplitude information, the first and second memories provide a three dimensional image of the target area. In accordance with the present teachings and as described more fully below, the three dimensional "sensed" image is compared to a three dimensional stored image to compare the aimpoint of the missile in the sensed image to the desired aimpoint of the missile in the stored image and generate guidance error correction signals in response thereto.

The amplitude image data is compared to reference data by a first digital correlator 22 in a conventional manner. The contrast reference map is stored in a third memory 26. The third memory 26 actually stores several maps. A map is chosen for correlation based on the aspect and dive angle of the missile as provided by a first circuit 28. The first correlator provides pitch and yaw angle information.

The range image data is compared to reference data by a second digital correlator 24 in a conventional manner such as that disclosed in the above-referenced U. S. patent. The range data is used to determine the elevation profile of the target area. A plurality of elevation profile reference maps are stored in a fourth memory 30. An elevation profile map is chosen for correlation based on the aspect and dive angle of the missile as provided by a second circuit for this purpose 32. The second correlator provides x,y,z information.

The first and second circuits 28 and 32 could be implemented with microprocessor programmed to construct a three dimensional model of the target scene in a conventional manner. The angle of approach to the target is supplied by the inertial system 40. With this information, the circuits 28 and 32 return the image of the target scene from that angle to the contrast and elevation profile reference maps 26 and 30.

The system 10 measures the impact position of the missile relative to the aimpoint thereof. Thus, the correlators measure the angle of the return relative to the velocity vector of the missile in two dimensions or angles (pitch and yaw) and the range to the target. Thus, the correlators allow an aimpoint to be transferred from a reference map to a sensed map. Location of the aimpoint in the sensed map provides range, pitch angle and yaw angle information relative to the current position of the missile. Aimpoint location error signals are shown stored in registers 34 and 36. These signals are used to generate a correction signal for an inertial measurement unit or global positioning system inertial navigation system 40 by an aimpoint selection circuit 38. Aimpoint selection is facilitated by the incorporation of the aimpoint into the scene data downloaded into the missile. Accordingly, the aimpoint selection circuit 38 may be implemented with an address in memory along with the contrast and elevation reference maps.

The inertial measurement unit provides guidance commands shown functionally at 42. In addition, the inertial measurement unit provides position at 44 because position changes as the range is measured in each image pixel in a serial manner by scanning the radar beam. This information is provided to the first memory 18. The inertial measurement unit also provides line of sight information in body coordinates 46 which, in turn, provides scan commands 48 to the antenna 12 in a conventional manner.

As is well known in the art, the accuracy of the guidance system is a function of beamwidth which determines pixel size. Generally, optimal tracking resolution is ½ a pixel size or ½ a beamwidth. The width of the beam is determined by points in the intensity density distribution profile at which the beam is at one half of its maximum intensity, i.e., the 3 db points of the system. By using millimeter wave frequencies, higher guidance accuracies may be obtained as a result of the more narrow beamwidth of millimeter wave frequencies as compared to lower frequency radar signals.

Figure 2:
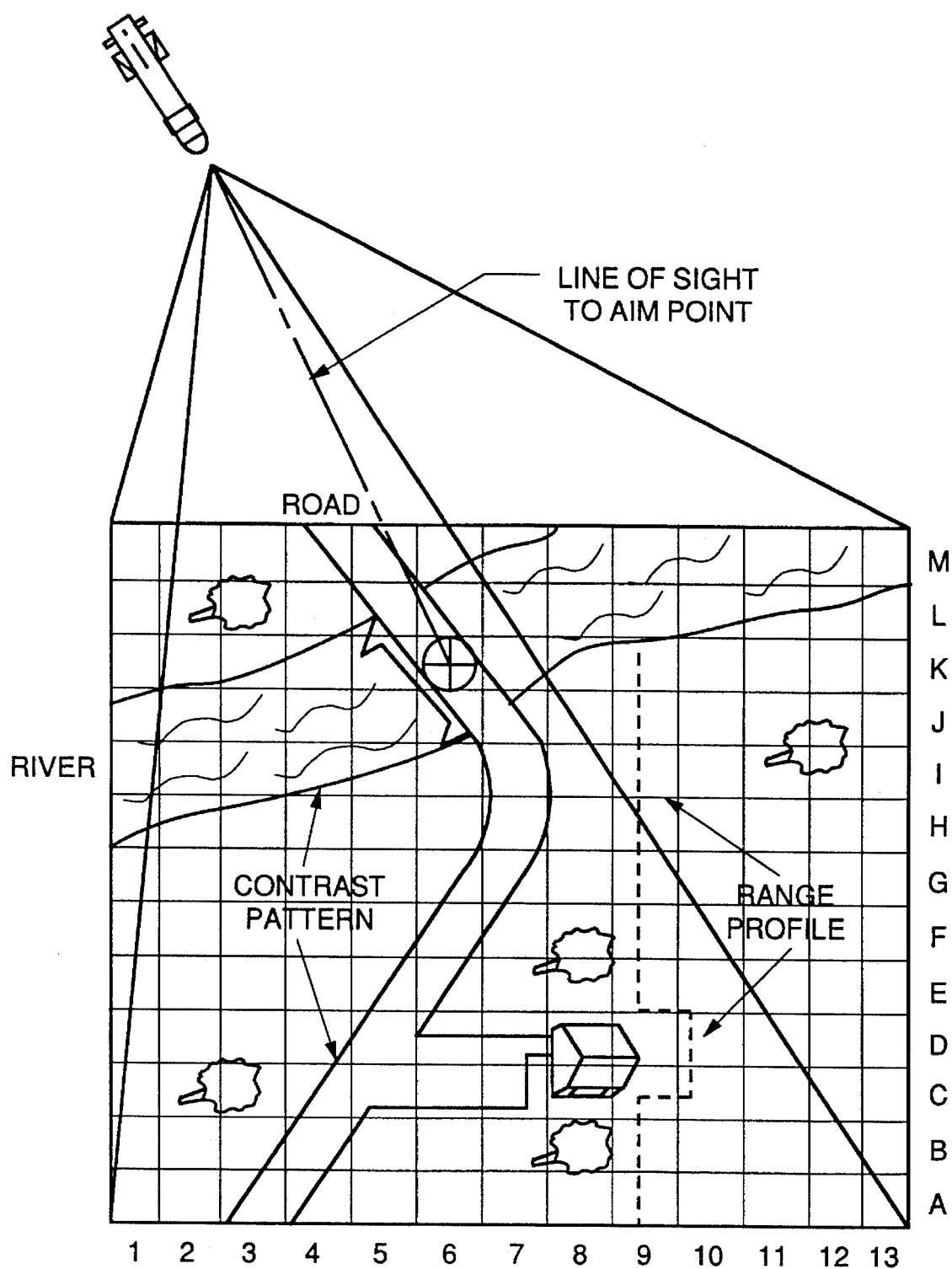
FIG. 2 is a topological view of a missile approaching an area having an object surrounded by background clutter.

FIG. 2 is a topological view of a missile approaching an area having an object surrounded by background clutter. As shown in FIG. 2, by scanning in two angular dimensions (azimuth and elevation), a frequency of 35 Ghz, 94 Ghz or higher produces a three dimensional image of a scene. The third dimension is generated by measuring range to the reflective surface in each pixel, minus compensation for motion of the missile during the scan. These images are then interpreted by a man in the loop or by matching to reference images, one a conventional intensity image and the other a range or third dimensional image. Three dimensional target data are derived from stereo photographs or new three dimensional synthetic aperture maps. An aim point for the seeker is then selected.

Range imaging can be displayed by employing a gray scale varying as a function of range, dark for objects at close range and white for distant objects. In the alternative, range image information may be displayed as pseudo color coded as a function of range.

Figure 3:
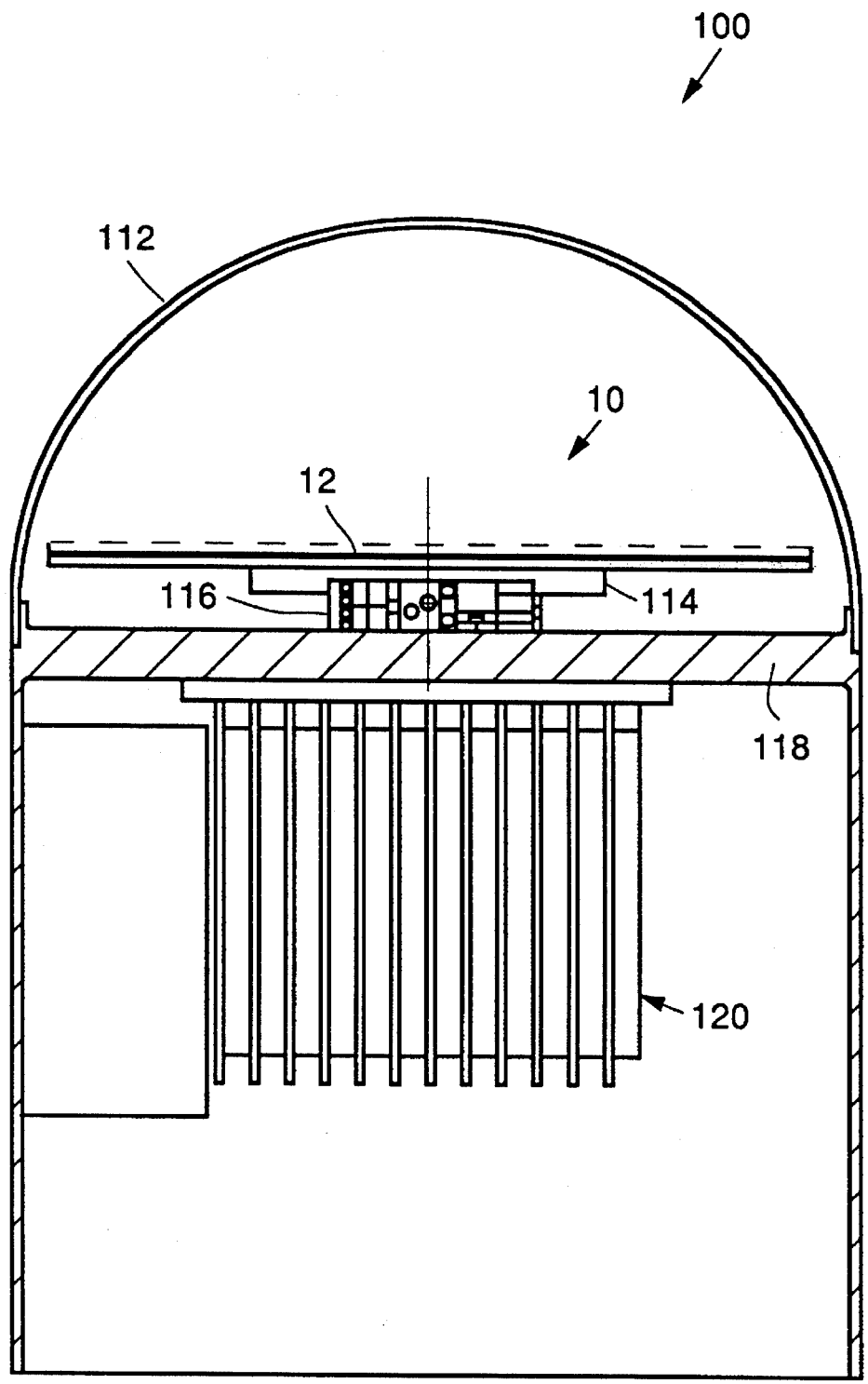
FIG. 3 is a sectional side view of a three dimensional imaging millimeter wave seeker for a missile incorporating a two dimensional electronically scanning antenna in accordance with the teachings of the present invention.

FIG. 3 is a sectional side view of a three dimensional imaging millimeter wave seeker 10 for a missile 100 incorporating a two dimensional electronically scanning antenna in accordance with the teachings of the present invention. The seeker 10 is disposed within the radome 112 of the missile 100. The antenna 12 is mounted on a back plate 114 and is connected to a transceiver 116 including the circulator 14, the transmitter 16, and the receiver 17 of FIG. 1. The transceiver 116 is mounted on the bulkhead 118 of the missile 100. Circuit cards 120 for the processor of the system including the memories 18, 20, 26, 30, 34 and 36, the correlators 22 and 24, and the other circuits 38–48 of FIG. 1 are shown to the right of the bulkhead 118.

Thus, the present invention has been described herein with reference to a particular embodiment for a particular application. Those having ordinary skill in the art and access to the present teachings will recognize additional modifications applications and embodiments within the scope thereof. For example, the invention is not limited to the scan configurations shown. Other scan configurations may be used with departing from the scope of the present teachings including: 1) a single axis electronic scan with a single axis mechanical scan, 2) a two axis electronic scan for a limited angle with two axis mechanical gimbals to compensate for angle of attack, 3) a two axis electronic scan for a limited angle plus a gimbal to compensate for body angle of attack and missile roll to keep the gimbal motion in the plane including the velocity vector and the angle of attack and 4) a two axis mechanical scan.

Figure 4:
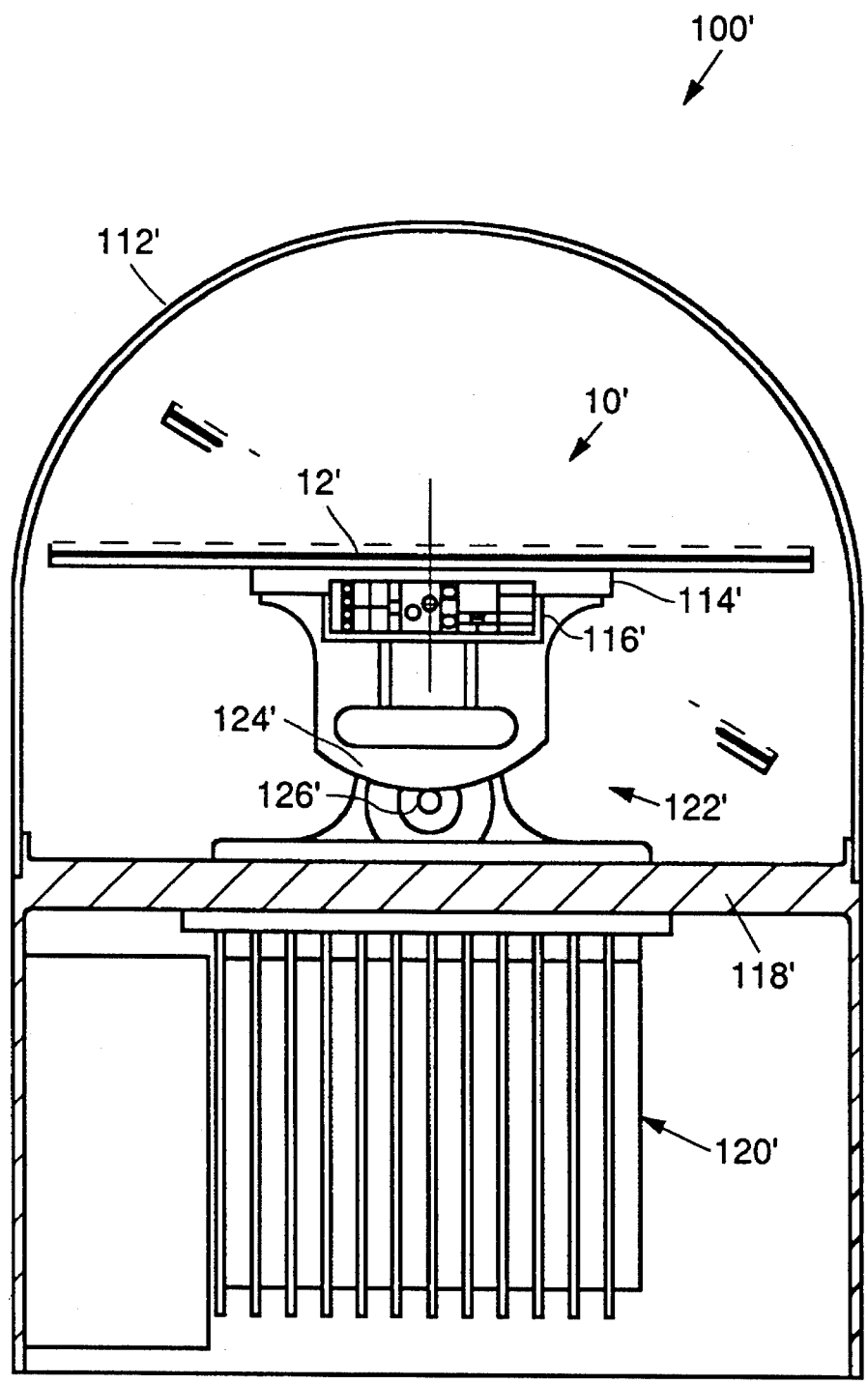
FIG. 4 is a sectional side view of an alternative embodiment of a three dimensional imaging millimeter wave seeker for a missile incorporating a one dimensional electronically scanning antenna mounted on a mechanical gimbal in accordance with the teachings of the present invention.

This is illustrated in FIG. 4 which shows a sectional side view of an alternative embodiment of a three dimensional imaging millimeter wave seeker 10' for a missile 100' incorporating a one dimensional electronically scanning antenna mounted on a mechanical gimbal in accordance with the teachings of the present invention. The seeker 10' is disposed within the radome 112' of the missile 100'. The antenna 12' is mounted on a back plate 114' and is connected to a transceiver 116' including the circulator 14', the transmitter 16', and the receiver 17' of FIG. 1. The transceiver 116' is mounted on the bulkhead 118' of the missile 100'. Circuit cards 120' for the processor of the system including the memories 18, 20, 26, 30, 34 and 36, the correlators 22 and 24, and the other circuits 38–48 of FIG. 1 are shown to the right of the bulkhead 118. This system is essentially the same as that of FIG. 3 with the exception that the antenna position in one axis is supplied by a mechanical gimbal arrangement 122' which includes a mechanical gimbal 124' and a gear section 126'. The mechanical gimbal scans the antenna from a first position as shown to a section position shown in phantom.

In addition, Those skilled in the art will appreciate that other antennas may be used including ferrite antennas with an index of refraction controllable as a function of an applied magnetic field and an antenna with multiple dipoles with individual phase shifters. Range, azimuth angle and elevation angle to the aimpoint point of the missile are measured for each image for input to the guidance system.

It is therefore intended by the appended claims to cover any and all such applications, modifications and embodiments within the scope of the present invention. Accordingly,

What is claimed is:

1. A guidance system for a missile having a velocity vector, said guidance system comprising:
    first means for transmitting a plurality of first radar signals at an area including a target and background clutter;
    second means mounted on said missile for receiving reflections of said radar signals from said target and said background clutter at first and second angles relative to said velocity vector and generating second signals in response thereto;
    third means for processing said second signals and constructing a three dimensional sensed image in response thereto, said third means including:
        means for processing said second signals and providing a plurality of third signals representing range as a function of said first and second angles and a plurality of fourth signals representing intensity as a function of said first and second angles,
        means for storing said third signals to provide a range image,
        means for storing said fourth signals to provide an amplitude image;
    fourth means for providing a three-dimensional stored image including:
        means for providing a first reference map for elevation profile and
        means for providing a second reference map for amplitude;
    fifth means for comparing said range image to said first reference map and providing a first error signal in response thereto;
    sixth means for comparing said amplitude image to said second reference map and providing a second error signal in response thereto;
    seventh means for processing said first and second error signals to provide a third error signal which represents a difference between an aimpoint of said missile in said sensed image and an aimpoint of said missile in said stored image; and
    eighth means for generating guidance correction signals for said missile from said third error signal.

2. The invention of claim 1 further including means for providing an indication of a change in the aspect and dive angle of the missile.

3. The invention of claim 2 wherein said means for providing a first reference map for elevation profile includes means for providing plural first reference maps.

4. The invention of claim 3 including means responsive to said means for providing an indication of a change in the aspect and dive angle of the missile for selecting one of said plural first reference maps for comparison to said range image.

5. The invention of claim 2 wherein said means for providing a second reference map for amplitude includes means for providing plural second reference maps.

6. The invention of claim 5 including means responsive to said means for providing an indication of a change in the aspect and dive angle of the missile for selecting one of said plural second reference maps for comparison to said amplitude image.

7. The invention of claim 1 wherein said first means includes a millimeter wave radar transmitter.

* * * * *